(12) United States Patent
Chen et al.

(10) Patent No.: US 7,447,942 B2
(45) Date of Patent: Nov. 4, 2008

(54) FAST DATA BREAKPOINT EMULATION

(75) Inventors: Michael Chen, Kirkland, WA (US);
Mark S. Larsen, Redmond, WA (US);
James A. Stulz, Bellevue, WA (US);
Gregory Hogdal, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 506 days.

(21) Appl. No.: 11/184,224

(22) Filed: Jul. 19, 2005

(65) Prior Publication Data

US 2007/0022322 A1    Jan. 25, 2007

(51) Int. Cl.
*G06F 11/00* (2006.01)
(52) U.S. Cl. .................... 714/38; 717/129; 717/124
(58) Field of Classification Search .................. None
See application file for complete search history.

(56) References Cited

U.S. PATENT DOCUMENTS

| | | | | |
|---|---|---|---|---|
| 5,664,159 A | * | 9/1997 | Richter et al. ................. 703/23 |
| 5,918,250 A | * | 6/1999 | Hammond ................... 711/205 |
| 7,047,520 B2 | * | 5/2006 | Moore et al. ................. 717/129 |
| 2004/0230954 A1 | * | 11/2004 | Dandoy ...................... 717/124 |

* cited by examiner

*Primary Examiner*—Christopher S McCarthy
(74) *Attorney, Agent, or Firm*—Woodcock Washburn LLP

(57) ABSTRACT

A technique to implement software debugging capability using breakpoints includes creating breakpoints, storing them in a watchlist, and paging out a virtual address (VA) to physical address (PA) page entry in a translation look-aside buffer (TLB). When software under test is run at full speed, memory is accessed via the TLB VA to PA page translations. When a translation is missing, an exception is generated. Handling the exception includes determining if the page missing from the TLB matches a breakpoint address in the watchlist. The address and operation type are compared to the watchlist. If the operation matches the address and not the specified data, then the software under test is single stepped, the TLB page is removed and the software under test continues to execute. If the breakpoint and data type matches, then a debugger is notified and debugger action to service the breakpoint occurs.

11 Claims, 5 Drawing Sheets

FAST DATA BREAKPOINT EMULATION

BACKGROUND OF THE INVENTION

One form of software testing involves running software under test using a target computing device that is compatible with the instruction set presented by the target device. In such a scenario, both the software under test and the target hardware may be under development. Accordingly, issues related to how the software under test interacts with the hardware may be under scrutiny. In such an environment, a hardware/software development system having a target device or emulator is typically used. It is common to use breakpoints in such an environment to check the progress of software execution by performing activities such as examining operands for a given address or other registers to determine the state of the target machine during the software execution. Breakpoints may generally be programmed into one part of the development system such that when an instruction pointer address matches the breakpoint, the development system halts execution of the software under test.

One typical development system may have one or more hardware devices which can detect the breakpoint address and halt execution of the software under test. In some instances, a software only solution to the hardware address detection mechanism is desired. However, such software only detection schemes can be very slow because the software program may single step through the software under test, generate an exception at every step, communicate with debugger software, determine if the breakpoint has been reached, and then execute the next step. Such a development system does not let the target hardware and software run at full speed.

Breakpoints based on data values are used in debugger technology to trigger a halt (or some actionable event) based on the access and content of a particular memory location. This access can be just a read or even a write of the same or a different value. In the case of a different value, this is a trigger on data change. Data breakpoints can also be called address breakpoints, since they trigger on an address access to examine the data.

There are typically two ways of implementing data breakpoint:

(A) Hardware support: typically in the form of on-chip address comparators linked to the exception mechanism. This is the most powerful and ideal solution for most cases.

(B) Software emulation: this is a usually very limited solution that can be used when no address comparators are available. The traditional method used for the data breakpoint software emulation is plagued with several major problems. Software data breakpoints generally only trigger on data change and are generally extremely slow. Software data breakpoints can only trigger after the access is done, not just before, unlike with address comparators. This occurs because software data breakpoints are based solely on single stepping every instruction and monitoring the change of value at the particular address pointed by the data breakpoint. An improvement in software-based data breakpoints is therefore desirable.

SUMMARY

The invention addresses a software debugger that has speed advantages. In one aspect of the invention, a virtual memory environment is used that implements a translation look aside buffer (TLB) for virtual address (VA) to physical address (PA) translations. A software breakpoint is set and placed into a watchlist. The virtual memory VA to PA translation in the TLB that corresponds to the watchlist breakpoint is paged out. A target device executes software under test until an exception occurs due to a TLB translation miss. A page table walk occurs and the missing VA to PA translation is placed into the TLB. The watchlist is compared to the new TLB entry. If the breakpoint in the watchlist does not correspond to the new TLB entry, then the software under test continues to execute at full speed. If there is a match between the new TLB entry and the breakpoint, then the breakpoint and instruction pointer data is further tested to determine if the instruction being executed corresponds closely to the breakpoint. If it does correspond, then the debugger is notified and a handling program services the interruption allowing user interaction if needed.

In an aspect of the invention, if the breakpoint is serviced or if the breakpoint is not a match for the current instruction, then the TLB is cleared of the new TLB page entry that corresponds to the breakpoint. This paging out of the TLB entry allows future virtual memory page accesses containing the breakpoint to be detected via the occurrence of a TLB miss exception.

DETAILED DESCRIPTION OF ILLUSTRATIVE EMBODIMENTS

Exemplary Embodiments

In an aspect of the invention, the preferable environment for implementation is a computer system that uses virtual memory. Examples of such systems are the Windows CE® and Windows XP® operating systems environments available from Microsoft® Corporation in Redmond, Wash. In another aspect of the invention, a fast breakpoint debugger suitable for a software implementation is contemplated.

Figure 1:
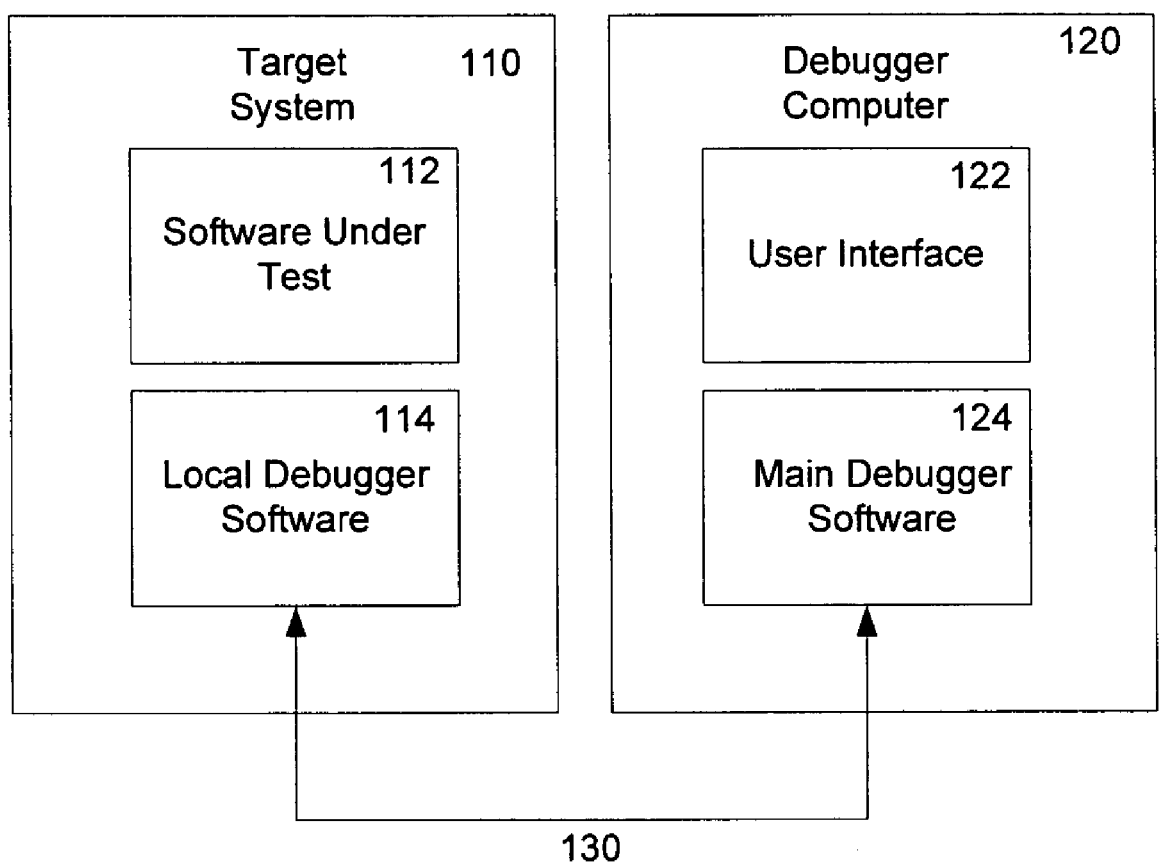
FIG. 1 is an example system for software testing using aspects of the invention.

FIG. 1 depicts an example system 100 as one embodiment of the invention. The system 100 includes a target system 110 which includes software under test 112 running on a target device (not shown) and local debugger software 114. The system also includes a debugger computer 120, such as a personal computer or mainframe computer that includes main debugger software 124 and a user interface 122. The local debugger software 114 in the target system 110 is in communication 130 with the main debugger software 124 in the debugger computer 120. In one aspect of the invention, the software under test 114 executes until a breakpoint is reached. In one embodiment, the breakpoint triggers a processing of breakpoint data in the local debugger software 114. In another embodiment, the breakpoint triggers processing of the breakpoint in the main debugger software 124. In either instance, a detection aspect of the invention involves determining if a translation look-aside buffer (TLB) needs to swap in an address page where the breakpoint resides before determining if the specific address being executed is a breakpoint address. In one embodiment of the invention (not shown), the local debugger software 114 and the main debugger software 124 are running on the same machine. In addition, in another embodiment (not shown), aspects of the main debugger software 124 and the local debugger software 114 are contained in the same program.

FIG. 2*a* is an example method 200 of a setup aspect of the invention. Initially, a breakpoint is created 210, by a user or by other means. The breakpoint may be generated via the user interface in the main debugger computer. Breakpoints usually define at least an address that an instruction pointer in a target machine accesses. In addition, breakpoints may optionally include data associated with the address and type information including whether the access is a read or write operation. The created breakpoint is tested to determine if the breakpoint is in a virtual memory (VM) page (step 220). If the breakpoint is not in a VM page, then a hardware breakpoint may be in the system and may be used instead of or in addition to a software breakpoint. If the breakpoint is in the VM page, then the page containing the breakpoint is removed from the translation look-aside buffer (TLB) (step 230).

A TLB is a device used in virtual memory systems to cache a translation of a virtual address (VA) into a physical address (PA). In a virtual memory environment, virtual address are generated and translated into physical addresses. The address translation is dependent on many factors including the paging of memory, the restrictions placed on the physical memory, and operating system and application constraints. When a virtual address is produced by an application, the virtual address must be translated into a physical address. If a VA to PA translation is not available in a TLB, a machine exception is generated to compute the address translation. Often, a page walk must be performed to compute the VA to PA translation. Page walks can be CPU cycle intensive. In order to streamline the conversion process, once a VA to PA translation for a memory page is computed, it is placed in a TLB which can then be used as a look-up cache of translation addresses.

Figure 2:
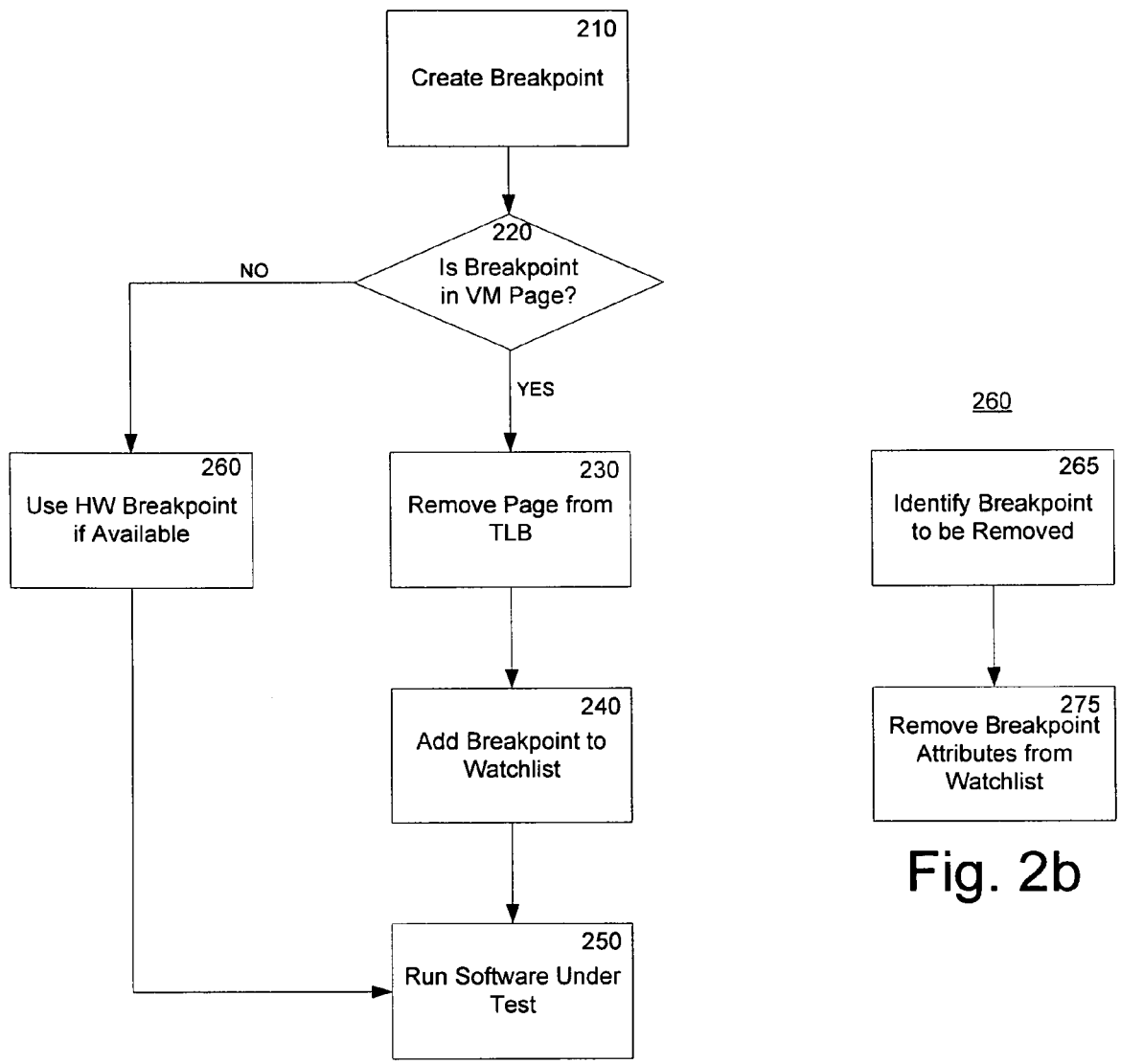
FIG. 2a is an example flow diagram showing a breakpoint setup aspect of the invention.
FIG. 2b is an example flow diagram showing a breakpoint removal aspect of the invention.

Returning to FIG. 2, once the VA to PA page is removed from the TLB (step 230), then the breakpoint is added to the watchlist (step 240). The watchlist thus becomes a list of breakpoints and related information. To this point, the breakpoints have bee set up and added to the watchlist, the TLB has been purged of the breakpoint of interest and the software under test may be executed (step 250). It should be noted the breakpoint may be added before or after the VM page is removed from the TLB. FIG. 2*b* depicts a method 260 where a breakpoint may be removed. Initially, a breakpoint to be removed is identified (step 265). The removal is effective when the breakpoint attributes are removed from the watchlist (step 275).

Figure 3:
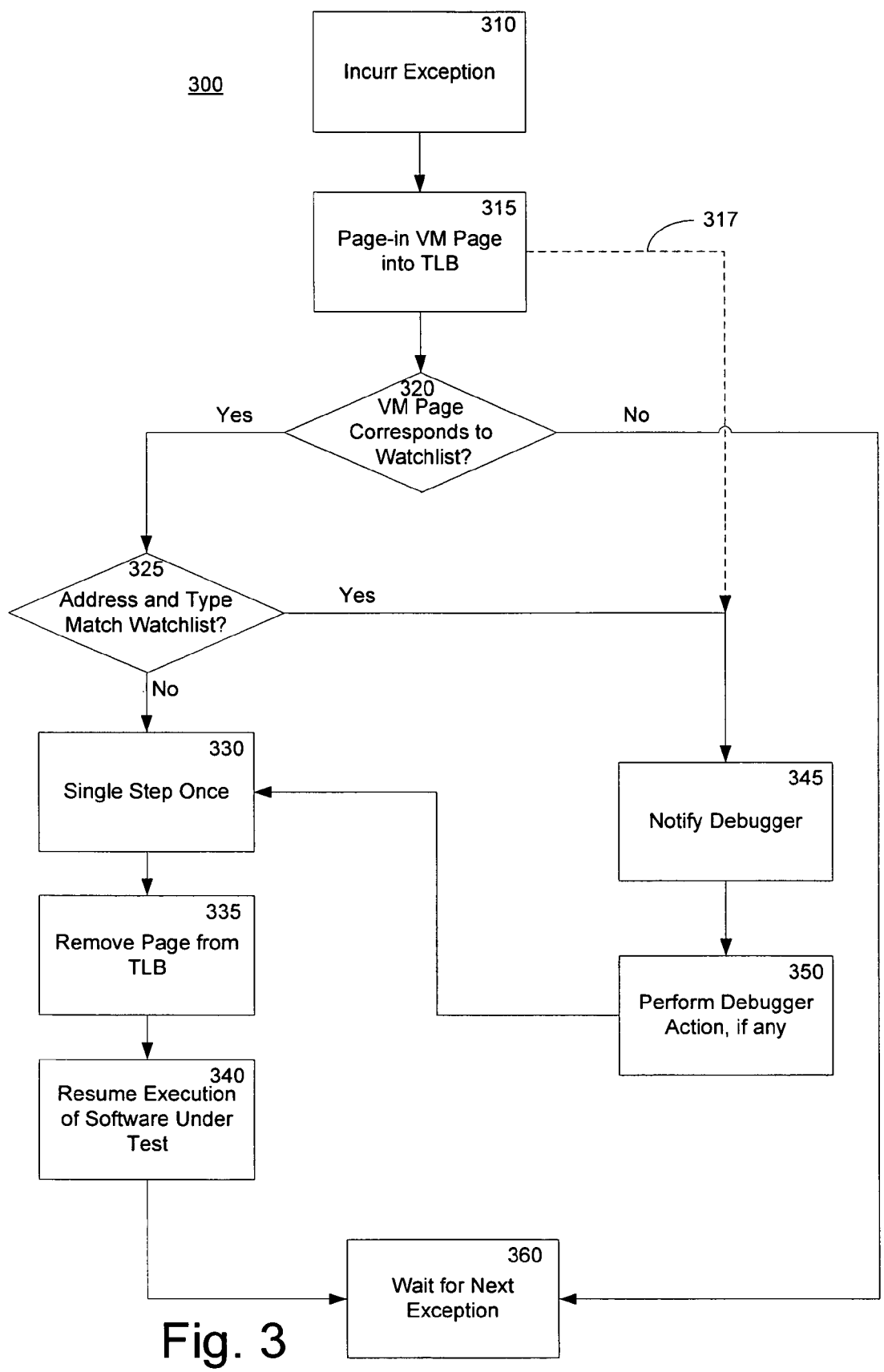
FIG. 3 is an example flow diagram showing a exception handling aspect of the invention.

FIG. 3 depicts an example method 300 involving exception handling aspects of the invention. Having a set up via the example method of FIG. 2, the software under test may execute at full speed in the target system until an exception is generated as a result of a VA to PA page translation miss in the TLB. The TLB miss exception (step 310) starts the computation of a page walk to determine the missing VA to PA address translation. Once that translation is computed, the VM page translation is placed into the TLB (step 315). In one embodiment, path 317 (dotted) may be taken which notifies a debugger (step 345) that an exception occurred and lets the debugger determine the cause of the exception and take any specific action (step 350). After completion of any action, execution may be resumed (step 330) and the method 300 eventually awaits the occurrence of a next exception (step 360).

In one embodiment, after the page-in of the VM page into the TLB (step 315), the method 300 tests to see if the VM translation page added to the TLB contains an address corresponding to one in the watchlist (step 320). If the newly added VM page entry in the TLB does not contain an address that matches with an address in the watchlist, the software under test in the target system continues to run at full speed until another exception is generated (step 360). In this path, an exception was generated but, the exception was related to an address page that was not only not in the TLB, but was also not of interest because it is not a page relating to a breakpoint in the watchlist.

If the VM page matches with an address in the watchlist (step 320), a second test is performed (step 325) to determine if the address and operation type matches with an element in the watchlist. Such elements may include such items as a virtual address, a data value or a write or read operation type. If the address matches but the operation type does not match the watchlist elements, then the target system is single stepped (step 330). This executes the instruction having the address and operation type that is of no interest to the breakpoint. Next, the VM page in the TLB is removed from the TLB (step 335). This allows the trapping of addresses in the page range of the breakpoint at a future time. Next, the execution of the software under test in the target system is resumed at full speed (step 340) and the method waits for the next exception to be generated (step 360).

If the address and operation type of the currently executing instruction does match elements in the watchlist (step 325), then the breakpoint of interest from the watchlist has been encountered and the debugger is notified (step 345). At this point, the debugger may perform any action (step 350) appropriate for the breakpoint such as an examination of key target system registers or requesting a user interface interaction. After the debugger action (step 350) is performed, the method may resume at step 330. This allows the debugger to single step (step 330), remove the page from the TLB (step 335) and allow the debugger to resume full speed (step 340) until the next exception is generated (step 360).

Note that the debugger notification in step 345 may notify either the local debugger software 114 or the main debugger software 124 of FIG. 1. In the case where the step 345 notification is to the local debugger software, the local debugger software would be responsible for initially performing any breakpoint related tasks. However, those task may include contacting the main debugger software. In the case where the step 345 notification is the main debugger software, the main debugger software in the debugger computer having the user interface may initially be responsible for performing any breakpoint related tasks. Those task, however, may include requesting information form the local debugger software and the target system to identify the breakpoint and provide the necessary information for the debugger computer or the user to determine the appropriate response to the breakpoint.

Figure 4:
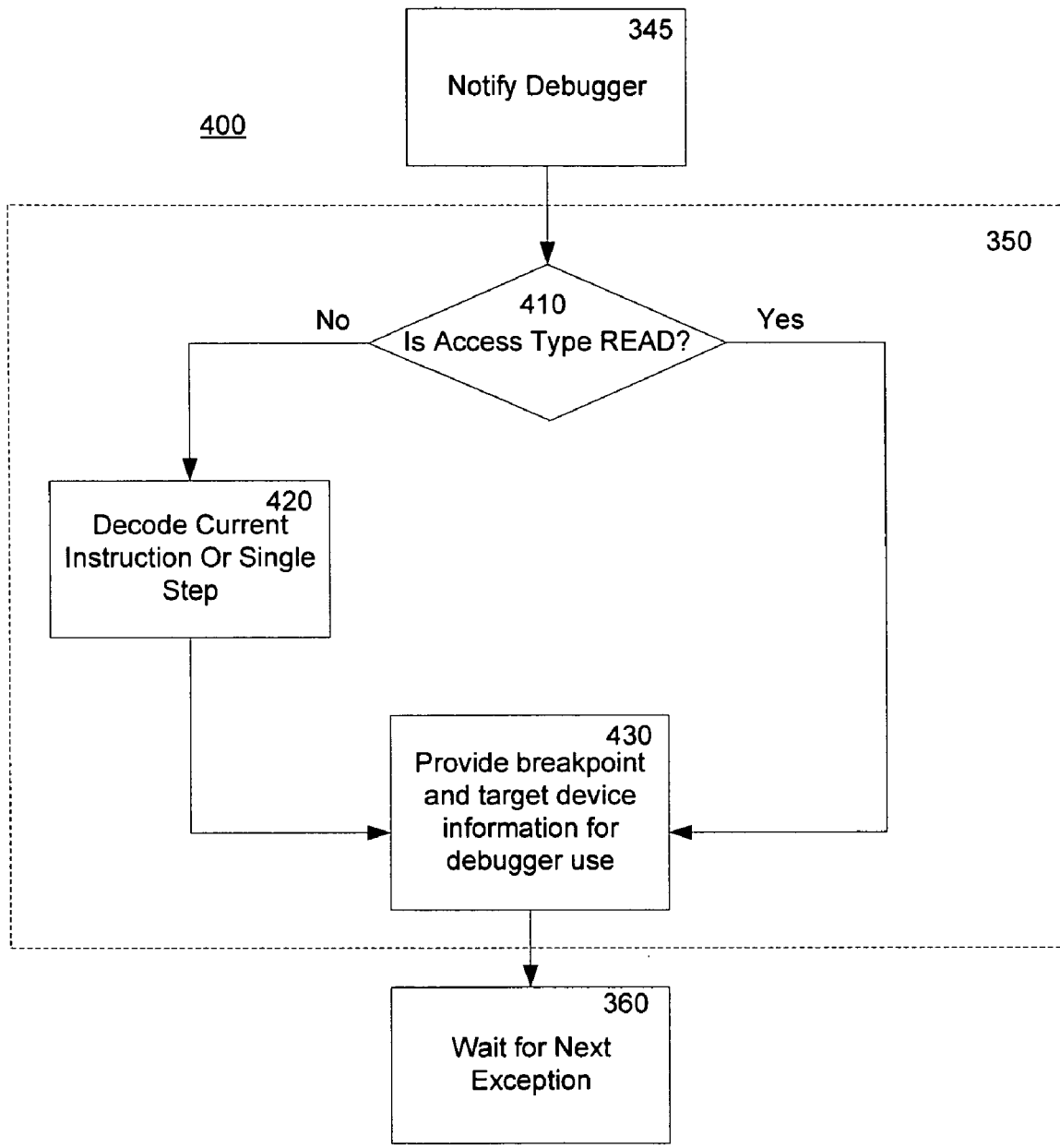
FIG. 4 is an example flow diagram showing a type detection aspect of the invention.

FIG. 4 depicts an example method 400 which may be used by either the local debugger software 114 or the main debugger software 124 to provide additional detail in step 350. Assuming that an address corresponding to elements of a breakpoint stored in the watchlist has been encountered, a debugger is notified (step 345). The debugger may perform an action (step 350) that includes determining if the operation or access type is a read or write operation (step 410). If the operation or access type is a read type, then the information concerning the breakpoint, including the breakpoint address and data and possibly other information concerning the state of the target device, are provided for use by the debugger (step 430). If the operation access type is a write, then the current instruction may be single stepped (step 420) before providing the relevant information to the debugger (step 430). Alternately, the current instruction may be decoded before instruction execution (step 420) and the information provided to the debugger (step 420). This unique feature allows the debugger or user to gain knowledge of the data to be written before the write instruction is performed. This allows a user to potentially change the write data before execution.

In one embodiment of the invention, the system can be used to place code breakpoints in read only memory (ROM). For example, when a processor tries to read an instruction that is listed on the watchlist and not cached in the TLB, and that instruction is an address in ROM, then the instruction will result in an exception. This allows the invention to effectively provide a code breakpoint in ROM.

Exemplary Computing Device

Figure 5:
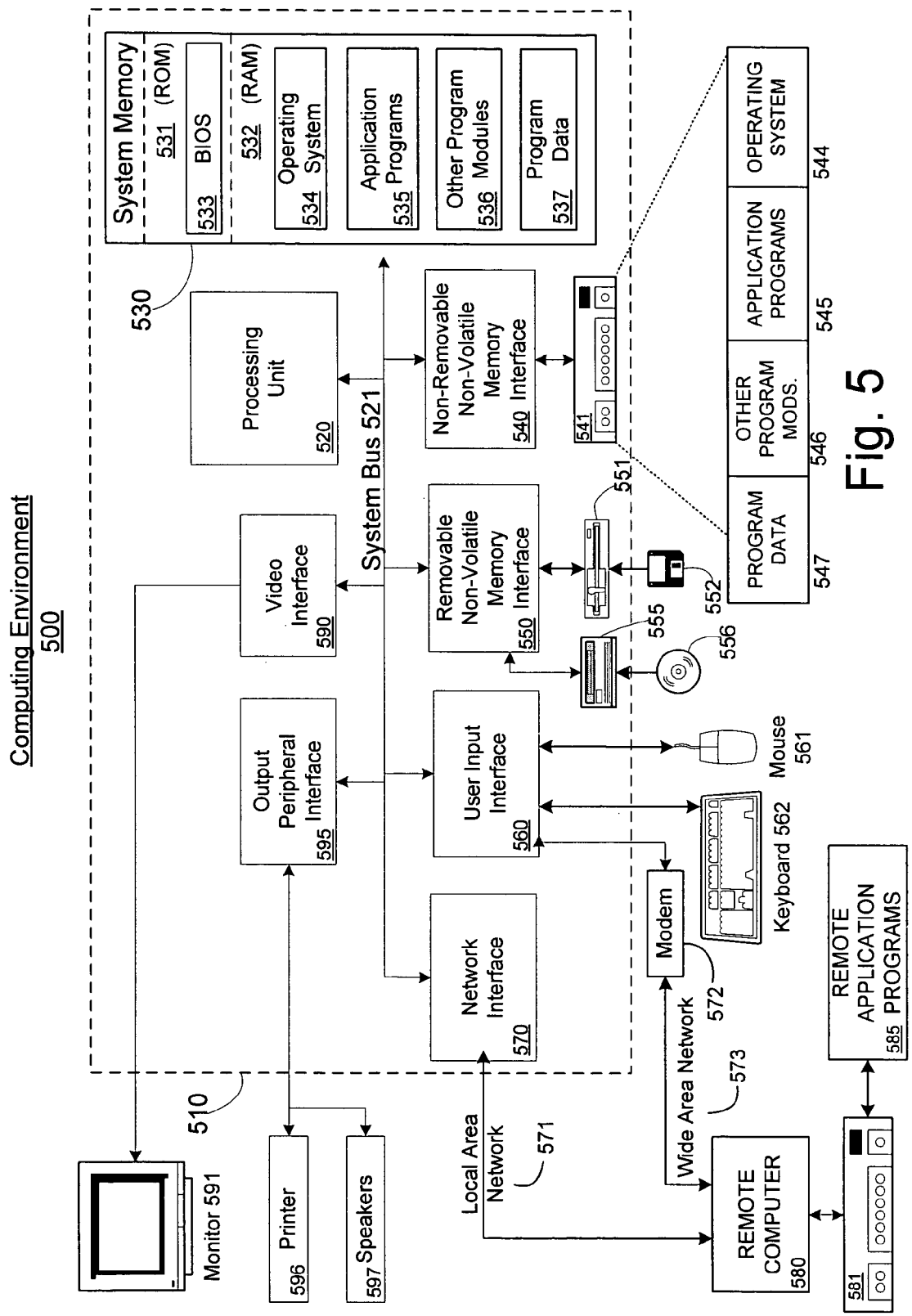
FIG. 5 is a block diagram showing an example computing environment in which aspects of the invention may be implemented.

FIG. 5 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 5 thus illustrates an example of a suitable computing system environment 500 in which the embodiments of the invention may be implemented, although as made clear above, the computing system environment 500 is only one example of a suitable computing environment and is not intended to suggest any limitation as to the scope of use or functionality of an embodiment of the invention. Neither should the computing environment 500 be interpreted as having any dependency or requirement relating to any one or combination of components illustrated in the exemplary operating environment 500.

With reference to FIG. 5, an exemplary system for implementing an embodiment of the invention includes a general purpose computing device in the form of a computer system 510. Components of computer system 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 510 typically includes a variety of computer readable media. Computer readable media can be any available media that can be accessed by computer system 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer system 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer system 510 may also include other removable/non-removable, volatile/nonvolatile computer storage media. By way of example only, FIG. 5 illustrates a hard disk drive 541 that reads from or writes to non-removable, non-volatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer readable instructions, data structures, program modules and other data for the computer system 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer system 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590, which may in turn communicate with video memory (not shown). In addition to monitor 591, computer systems may also include other peripheral output devices such as speakers 597 and printer 596, which may be connected through an output peripheral interface 595.

The computer system 510 may operate in a networked or distributed environment using logical connections to one or more remote computers, such as a remote computer 580. The remote computer 580 may be a personal computer, a server, a router, a network PC, a peer device or other common network node, and typically includes many or all of the elements described above relative to the computer system 510, although only a memory storage device 581 has been illustrated in FIG. 5. The logical connections depicted in FIG. 5 include a local area network (LAN) 571 and a wide area network (WAN) 573, but may also include other networks/buses. Such networking environments are commonplace in homes, offices, enterprise-wide computer networks, intranets and the Internet.

When used in a LAN networking environment, the computer system 510 is connected to the LAN 571 through a network interface or adapter 570. When used in a WAN networking environment, the computer system 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer system 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method to implement fast a software debugging capability using breakpoints. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

The invention claimed is:

1. A method of generating a breakpoint halt in a software program, the method comprising:
    receiving a first breakpoint in the software program, the first breakpoint containing a first address and at least one attribute from the group consisting of a data value, a read instruction and a write instruction, the software program to be executed in a virtual memory environment using virtual address (VA) to physical address (PA) page translations in a translation look-aside buffer (TLB);
    removing an entry from the TLB, the entry corresponding to a page comprising the first breakpoint;
    adding the first address of the first breakpoint to a watchlist;
    executing the software program until an exception is generated, the exception occurring upon an attempted access to a memory location whose VA to PA page translation is absent from the TLB;
    generating a TLB entry for the absent page translation;
    determining if the memory location matches the first address in the watchlist and determining if the memory location and information associated with access to the memory location matches the at least one attribute associated with the first breakpoint in the watchlist;
    halting execution of the software program if the memory location matches the first address;
    decoding the instruction corresponding to the memory address if the write instruction is present; and
    notifying a debugger program of the write instruction and the value of the data to be written, whereby the data to be written may be modified by the debugger before execution of the write instruction.

2. The method of claim 1, further comprising:
    single stepping the software program under test if the breakpoint does not match the first address;
    removing the TLB entry for the absent page translation; and
    resuming execution of the software under test.

3. The method of claim 1, further comprising:
    single stepping the software program to execute the write instruction before halting execution of the software program.

4. A method of generating a breakpoint halt in a software program, the method comprising:
    receiving a first breakpoint in a software program, the first breakpoint comprising a first address and at least one of an attribute from the group consisting of a data value, a read instruction and a write instruction, the software program to be executed in a virtual memory environment using virtual address (VA) to physical address (PA) page translations in a translation look-aside buffer (TLB);
    removing an entry from the TLB, the entry corresponding to a page comprising the first breakpoint;
    adding the first address of the first breakpoint to a watchlist;
    executing the software program until an exception is generated, the exception occurring upon attempted access to a memory location whose VA to PA page translation is absent from the TLB;
    generating the a TLB entry for the absent page translation;
    pausing execution of the software program; and
    notifying debugger software of the exception, wherein the debugger software identifies a cause of the exception;
    determining if the memory location matches the first address in the watchlist and determining if the memory location and information associated with access to the memory location matches the at least one attribute associated with the first breakpoint in the watchlist;
    decoding the instruction corresponding to the memory address if a write instruction is present; and
    notifying a debugger program of the write instruction and the value of the data to be written, whereby the data to be written may be modified by the debugger before execution of the write instruction.

5. The method of claim 4, further comprising:
    determining if the memory location matches the first address in the watchlist; and
    continuing the pause of execution of the software program if the memory location matches the first address.

6. The method of claim 4, further comprising:
    single stepping the software program under test if the breakpoint does not match the first address;
    removing the TLB entry for the absent page translation; and
    resuming execution of the software under test.

7. The method of claim 4, further comprising:
    single stepping the software program to execute the write instruction.

8. A system for debugging computer software, the system comprising:
    a target device executing software under test in a virtual memory environment using virtual address (VA) to physical address (PA) page translations in a translation look-aside buffer (TLB);
    a main debugger controller comprising main debugger software and a user interface;
    local debugger software associated with the target device executing a method comprising:
        executing the software under test until an exception is generated, the exception occurring upon attempted access to a selected memory location whose VA to PA page translation is absent from the TLB;
        generating a TLB entry for the absent page translation; and identifying the cause of the exception with the aid of a watchlist, wherein the watchlist is set up to contain a first breakpoint corresponding to the selected memory location, wherein identifying the cause of the exception using the watchlist comprises:
pausing execution of the software program under test;
determining, by the local debugger, if the memory location matches the first breakpoint of the watchlist;
single stepping the software program under test if the breakpoint does not match watchlist;
removing the TLB entry for the absent page translation; and
resuming execution of the software under test;
wherein the user interface is activated to enable a modification of the software under test after the step of pausing execution.

9. The system of claim 8, wherein the step of identifying the cause of the exception comprises:
pausing execution of the software program under test; and
communicating with the main debugger controller indicating an exception was generated at the first breakpoint before identifying the cause of the exception.

10. The system of claim 8, further comprising the method steps of:
pausing execution of the software program under test;
determining if the memory location matches the first breakpoint of the watchlist; and
halting execution of the software under test if the first breakpoint matches the watchlist.

11. The system of claim 8, wherein the target device comprises a read only memory having the selected memory location corresponding to the first breakpoint.

* * * * *